April 7, 1931. G. F. YEVSEYEFF 1,799,577
PACKING RING
Filed Feb. 11, 1927
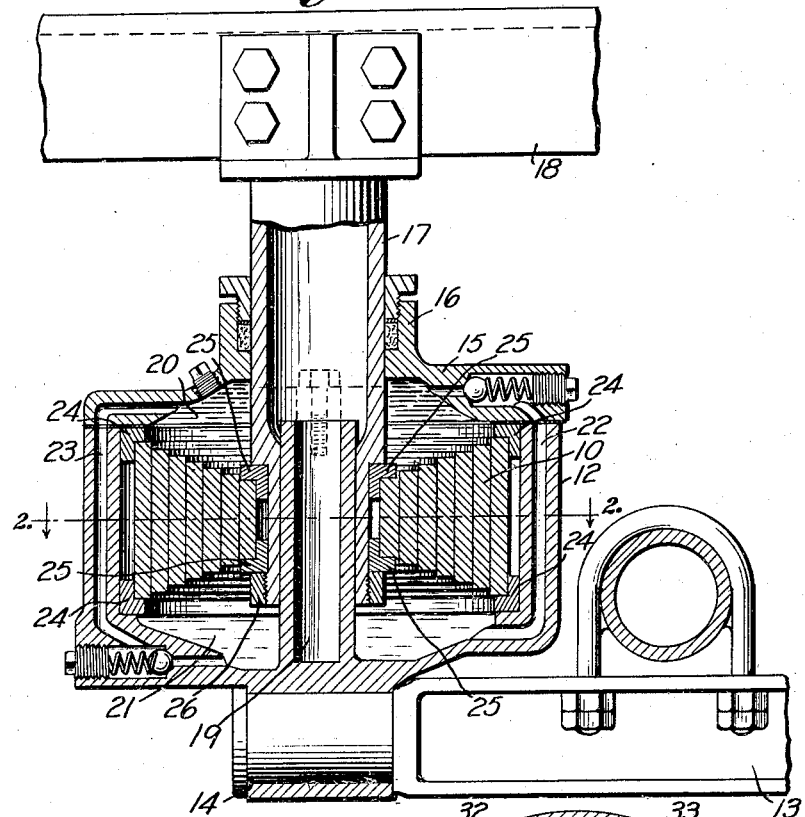
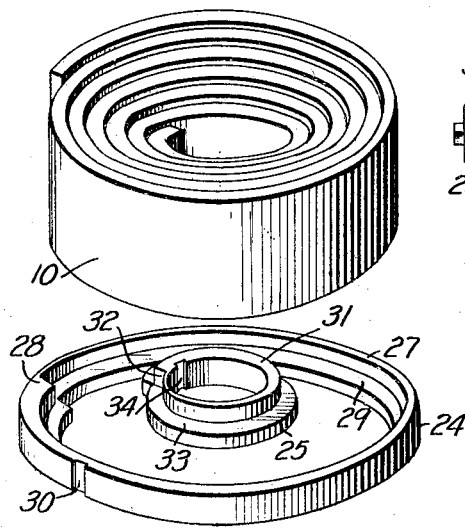
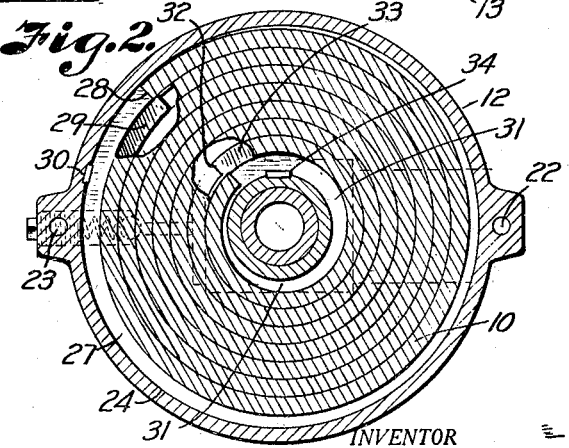
INVENTOR
George F. Yevseyeff.
BY
ATTORNEY Patented Apr. 7, 1931

1,799,577

UNITED STATES PATENT OFFICE

GEORGE F. YEVSEYEFF, OF WINDSOR, ONTARIO, CANADA

PACKING RING

Application filed February 11, 1927. Serial No. 167,462.

The invention relates to packing rings and is particularly designed to provide a seal or packing between the ends of a coiled element, such as a coiled spring, and a member with which the coiled element is associated to prevent escape of fluid between said coiled element and the member.

The invention is herein shown and described in conjunction with a shock absorber for vehicles, such as that shown in my application for Letters Patent filed August 2, 1926, Serial No. 126,472, in which a coiled helical spring is employed to yieldably resist the relative movement of the chassis and running gear of a vehicle and in which a fluid is utilized and divided by the convolutions of the spring which acts as a diaphragm to force the liquid from one side of a chamber in which the spring is located to another upon distending of the spring in either direction.

The invention has as its prime object the provision of a packing element which will seal and prevent leakage of the fluid between the spring and the chamber and also between the opposite end of the spring and a member to which this latter end is connected.

It is a further object of the invention to provide a packing which will provide a seal between elements such as above referred to and which will also maintain the convolutions of the spring in proper relation to each other to prevent leakage of the fluid between the convolutions of the spring and to, in addition, provide a means against which the edges of the ends and adjacent convolution of the spring may abut and thereby cause relative movement of the opposite and intermediate parts of the spring upon relative movement of those parts of the vehicle above referred to.

The invention has these and other objects, all of which will be explained in conjunction with the accompanying drawings which illustrate one embodiment of which the invention is susceptible, it being obvious that changes and modifications may be resorted to without departing from the spirit of the appended claims forming a part hereof.

In the drawings:

Fig. 1 is a sectional view showing a shock absorber secured to a frame and axle of a vehicle having the invention applied thereto.

Fig. 2 is a section taken on line 2—2 of Fig. 1, and

Fig. 3 is a perspective view showing the elements employed for accomplishing the invention in separated relation to each other.

The invention is herein shown as applied to a shock absorber such as shown and described in my application hereinabove referred to, in which a coiled spring 10 is utilized to resist the movement of the frame and axle of a vehicle, and in which the spring is housed within a casing 12 and connected at an end thereto. The housing is secured to the axle 13 at 14 and is closed by a cap 15 having the neck 16 which surrounds the extension 17, the latter of which protrudes from the frame 18 of the vehicle and has the opposite end of the spring connected to it.

The housing 12 has an extension 19 which is reciprocably mounted in the tubular extension 17.

The spring in addition to resisting the movement of the elements hereinabove referred to, also provides what might be termed a diaphragm and divides the chamber 12 into compartments 20 and 21, within which fluid, such as oil, is retained, the latter of which is forced from one chamber to another upon movement of the spring, this being accomplished through the medium of the valve-controlled passages 22 and 23, which respectively lead to and from the chambers 20 and 21. The structure thus far described is all fully shown and described in the application above referred to and forms no part of the present invention.

The structure forming the basis of the present application is most clearly shown in Fig. 3 and involves the use of packing rings, generally designated 24 and 25, which are respectively interposed between the outermost convolutions of the coil spring and the chamber 12 and the innermost convolution of the spring and the extension 17 to provide a packing at these points to prevent the escape of oil from one chamber to the other through the spring and particularly between the space which would ordinarily result between these parts by the use of a volute spring such as illustrated in the drawings. These packing rings 24 and 25 are respectively arranged as above referred to and in addition engage the edges of the opposite ends of the spring.

The rings, such as 24, are held in proper position within the chamber 12 at the edges of the spring by means of the cap 15, whereas the packing rings, such as 25, which are arranged at the innermost convolution of the coil, are held in associated relation with a shouldered portion of the extension 17 through the medium of a nut 26, which is threadedly secured to the lowermost end of said extension.

By referring particularly to Fig. 3 in which the rings 24 and 25 are most clearly illustrated, it will be noted that each ring 24 is formed with a flange 27 and a shoulder 28, against the latter of which the end of the spring abuts. This flange 27 gradually increases in thickness from the shoulder 28 throughout its entire circumference and terminates in a relatively wide portion which forms the shoulder or abutment 28. This portion of the ring substantially corresponds or is complementary to the space which would ordinarily exist between the endmost coil of the spring and the wall of the chamber or housing and thus, when interposed between the spring and the housing, will provide a ring which will close the space ordinarily existing between the end-most and adjacent convolution of the spring and seal this space against leakage of the fluid therebetween. The ring 24 has a flange 29 which is arranged transversely to the flange 27 and this flange substantially corresponds in outline to the flange 27 and provides a shoulder against which the side edges of the last-mentioned portions of the spring may rest or abut to secure these last-mentioned portions of the spring against movement relative to the housing when arranged therein.

The ring 24 is provided with a key slot 30 whereby the ring may be keyed against rotative movement relatively to the casing.

The packing rings 25 which are, as before stated, secured to the extension 17, are provided with an upwardly extending flange 31, which also corresponds in outline or is complementary to the space which would ordinarily exist between the innermost end and adjacent coil of the spring and that portion surrounded by the end and adjacent portion of the spring.

The flange 31 is formed with a shoulder or abutment 32 similar to the abutment 28 of the ring 24 and is provided to produce a means against which the edge of the end of the spring may abut. The ring 25 is provided with a transversely arranged flange 33 which projects outwardly relatively to the flange 31 and is provided to produce a means against which the edge of the adjacent portion of the spring may abut, as explained regarding the flange 29 of the ring 24.

The ring 25 has a key slot 34 so that these rings may be keyed to the extension 17 and held against relative rotation with respect to the said extension.

From the foregoing description of the construction of the rings 24 and 25, it is manifest that these rings are provided with portions which are complementary to the space which would ordinarily exist between the ends of the spring and the wall of the chamber or a shaft with which the spring is associated, and therefore will, when arranged upon opposite sides of the inner and outer ends of said springs, prevent the escape of fluid through this space.

It is also manifest that the transverse portions 33 and 29 of the respective rings will engage the edges of the springs and thereby transmit any endwise movement which may occur between the elements to which the opposite ends of the springs are connected.

It is also evident that said rings will maintain the outer and the inner convolutions of the springs in close contact with each other to provide a diaphragm of said coils.

What I claim and desire to secure by Letters Patent is:

1. In combination, a volutely coiled member, and a packing ring adapted to provide a seal between an end of the coiled member and a member with which said coiled member is associated, said ring having a shoulder with which the end of the coiled member abuts and said ring diminishing in cross section from the shoulder throughout the circumference thereof and having a part which is arranged transversely to said first-mentioned portion providing a shoulder against which an edge of said end and of the adjacent convolution of the coiled member abuts.

2. In combination with a volute spring and the peripheral wall of a body associated with said spring, sealing and supporting means interposed between the spring and the wall, comprising a ring having walls complementary to the contour of the spring and the peripheral wall respectively, and a depending peripheral flange extending laterally from the ring.

3. In a shock absorbing device, the combination of a casing, a plunger, a volute spring having ends for engagement respectively with the casing and the plunger, and sealing means comprising complementary annuli engaged respectively with the casing and the plunger and having seats respectively for the outer and inner convolutions of the spring including spring-retaining means.

4. In combination with a volute spring and a wall of a cylindrical body associated with said spring, sealing means including supporting means interposed between said spring and the wall, comprising an annulus having walls complementary to the contour of a terminal convolution of the spring and the cylindrical wall respectively, and having a depending peripheral lateral flange, and means for securing the annulus in fixed relation to the cylindrical body.

5. In combination with a volute spring and the wall of a body associated with the spring, a packing ring conforming to the contour of a terminal convolution of the spring to form an abutment for one end of the spring, and interposed between the spring and the wall, and having a lateral flange to abut an adjacent edge of the spring, and means on the wall for retaining the ring.

In testimony whereof I affix my signature.

GEORGE F. YEVSEYEFF.